United States Patent
Cordon Compañ

(10) Patent No.: US 10,852,045 B2
(45) Date of Patent: Dec. 1, 2020

(54) EXTRUDER FOR AN ICE MACHINE

(71) Applicant: INDUSTRIA TECNICA VALENCIANA, S.A., Valencia (ES)

(72) Inventor: Cristina Cordon Compañ, Valencia (ES)

(73) Assignee: ITV ICE MAKERS, S.L., Valencia (ES)

( * ) Notice: Subject to any disclaimer, the term of this patent is extended or adjusted under 35 U.S.C. 154(b) by 67 days.

(21) Appl. No.: 16/211,019

(22) Filed: Dec. 5, 2018

(65) Prior Publication Data

US 2020/0173705 A1  Jun. 4, 2020

(30) Foreign Application Priority Data

Nov. 29, 2018 (EP) .................................... 18382868

(51) Int. Cl.
*F25C 1/10* (2006.01)
*F16B 37/00* (2006.01)

(52) U.S. Cl.
CPC ................ *F25C 1/10* (2013.01); *F16B 37/00* (2013.01); *F16B 2200/506* (2018.08)

(58) Field of Classification Search
CPC ................ F25C 1/14; F25C 1/147; F25C 5/14
See application file for complete search history.

(56) References Cited

U.S. PATENT DOCUMENTS

| | | | | |
|---|---|---|---|---|
| 3,403,526 A * | 10/1968 | Brindley | ................ | F25C 1/147 62/188 |
| 3,910,060 A * | 10/1975 | Beusch | .................... | F25C 1/147 62/188 |
| 4,497,184 A * | 2/1985 | Utter | ........................ | F25C 1/147 100/117 |
| 4,574,593 A * | 3/1986 | Nelson | .................... | F25C 1/147 62/320 |
| 4,576,016 A * | 3/1986 | Nelson | .................... | F25C 1/147 62/320 |
| 5,189,891 A * | 3/1993 | Sakamoto | ............... | F25C 1/147 100/117 |
| 6,540,067 B1 * | 4/2003 | Sellers | .................... | F25C 1/147 198/657 |
| 2013/0276472 A1 * | 10/2013 | Mitchell | ............... | F25D 17/065 62/344 |
| 2016/0201967 A1 * | 7/2016 | Mitchell | .................... | F25C 5/22 62/135 |
| 2016/0242600 A1 * | 8/2016 | Vacher | .................. | B02C 18/305 |
| 2017/0211863 A1 * | 7/2017 | Nuss | .......................... | F25C 1/25 |
| 2017/0234595 A1 * | 8/2017 | Mitchell | .................... | F25C 5/02 62/342 |

(Continued)

*Primary Examiner* — Cassey D Bauer
(74) *Attorney, Agent, or Firm* — Aslan Law, P.C.

(57) ABSTRACT

An extruder for an ice machine essentially made up of a monoblock body which is configured from a first body essentially joined to a second cylindrical body, hollow as well in the central portion thereof, and that on the lower portion thereof defines a threaded portion for the joining thereof to an ice machine, through a plurality of holes; and wherein, in the central portion of the body coinciding with the central portion of the second body, a plurality of hollows are located in each body, which determine the inlet and the outlet of a series of channels through which the ice passes towards the outlet of the cited extruder, and wherein said hollows have a "kidney" shape with one concave side and another convex one.

9 Claims, 3 Drawing Sheets

(56) References Cited

U.S. PATENT DOCUMENTS

| | | | |
|---|---|---|---|
| 2017/0292748 A1* | 10/2017 | Gullett | F25D 11/02 |
| 2018/0017306 A1* | 1/2018 | Miller | F25C 1/147 |
| 2019/0226741 A1* | 7/2019 | Mitchell | F25C 5/22 |
| 2019/0257566 A1* | 8/2019 | Mitchell | F25C 1/147 |
| 2019/0293336 A1* | 9/2019 | Bertolini | F25C 5/046 |

* cited by examiner

EXTRUDER FOR AN ICE MACHINE

OBJECT OF THE INVENTION

The object of the present specification is an extruder for an ice machine, the main and distinctive characteristic of which is based on the fact of having a configuration suitable for optimizing the outlet of the ice such that in turn it reduces the cross section thereof and makes it compact, reducing the water content thereof to a desired percentage, achieving a greater percentage of moisture than others known in the technical field.

BACKGROUND OF THE INVENTION

Currently, extrusion is known as the manufacturing process with the aim of creating objects with a certain transverse cross section (usually of a fixed nature), wherein the material used is extracted through a part known as an extruder and which determines the shape of the cited extruded element. Said extrusion methods are used in diverse technical sectors from the industrial sector to the food sector, wherein it has been very well accepted due to the possibility of determining shapes with materials with low consistency, with optimal results.

In the field of the food industry, and more specifically for the case of machines for manufacturing ice, the extruder is usually placed inside the machines secured thereto by means of screws. This implies a difficulty for the installation and/or assembly thereof, and above all, problems with the sealing of the cited machine, which makes it more difficult to obtain ice with a certain degree of quality.

In order to alleviate said problem, the invention proposed herein solves these problems by means of manufacturing an extruder that is designed to be placed externally on the evaporator, such that the assembly thereof is facilitated.

DESCRIPTION OF THE INVENTION

The technical problem solved by the present invention is achieving an extruder for an ice machine, which enables the sealing of the machine to be ensured where it is installed, and facilitate the installation thereof. To do so, the extruder for an ice machine, object of the present specification, which comprises a monoblock body which is configured from a first body that is essentially circular and hollow in the center thereof that is firmly joined to a second cylindrical body, hollow as well in the central portion thereof, and that on the lower portion thereof defines a threaded portion for the joining of the extruder to an ice machine, and wherein the first body incorporates a plurality of holes which enable the fastening thereof to an ice machine; and wherein, in the central portion of said body coinciding with the central portion of the second body, a plurality of hollows are located in each body, coinciding in location with the ones located in the opposite body, facing each other, and which determine the inlet and the outlet of a series of channels through which the ice will pass towards the outlet of the cited extruder.

Due to the design thereof, the extruder contemplated herein will reduce the cross section of the ice by making it compact and reducing the water content to the optimal percentage of moisture necessary, such that the manufacturing costs will be reduced, increasing the profitability thereof.

The extruder, unlike other similar solutions, will enable pieces of ice with different shapes (and different degrees of moisture) to be obtained, thus personalizing the production of a wide range of possible results, and therefore, making the use thereof versatile in the ice industry, since it will be able to be used indistinctly in several production lines without needing a large amount of operating and maintenance work, simply substituting the type of extruder with the one required for said product.

The extruder presented herein will enable a certain shape of ice to be achieved, known as a "nugget", the certain shape of which is achieved due to the holes arranged in the cited part described herein.

BRIEF DESCRIPTION OF THE FIGURES

What follows is a very brief description of a series of drawings that aid in better understanding the invention and which are expressly related to an embodiment of said invention that is presented by way of a non-limiting example of the same.

DESCRIPTION OF A DETAILED EMBODIMENT OF THE INVENTION

Figure 1:
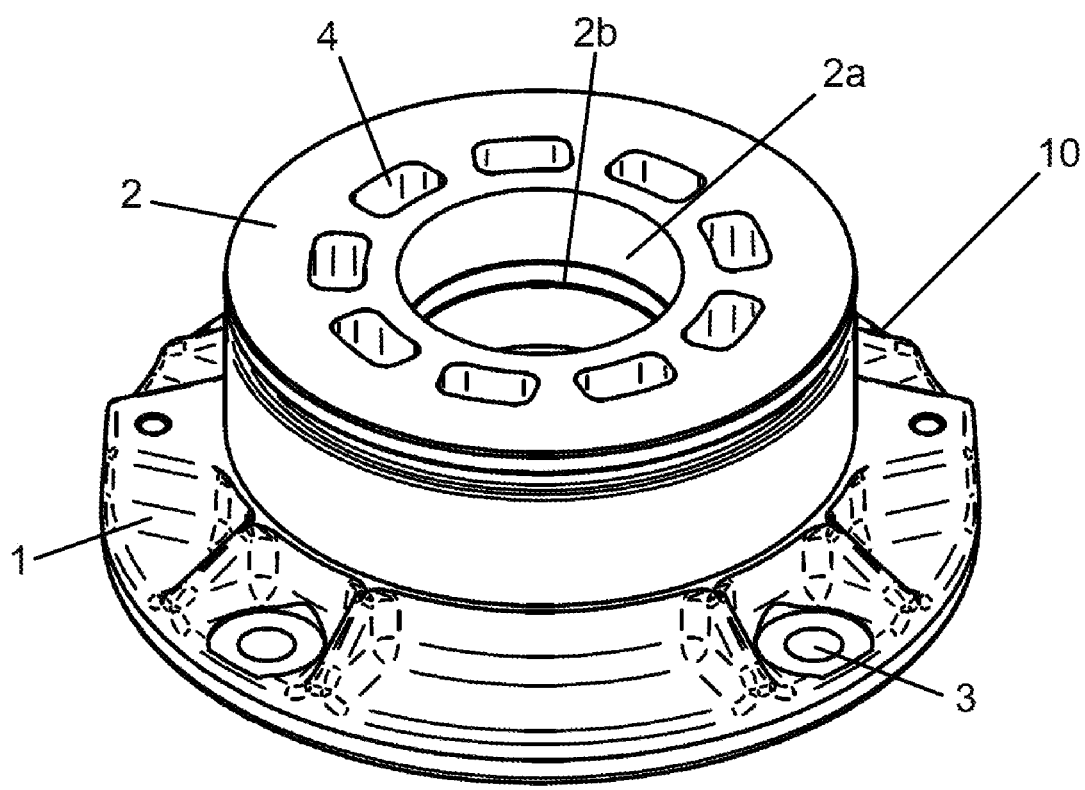
FIG. 1 Shows a first view of the extruder for an ice machine, object of the present specification.
Figure 2:
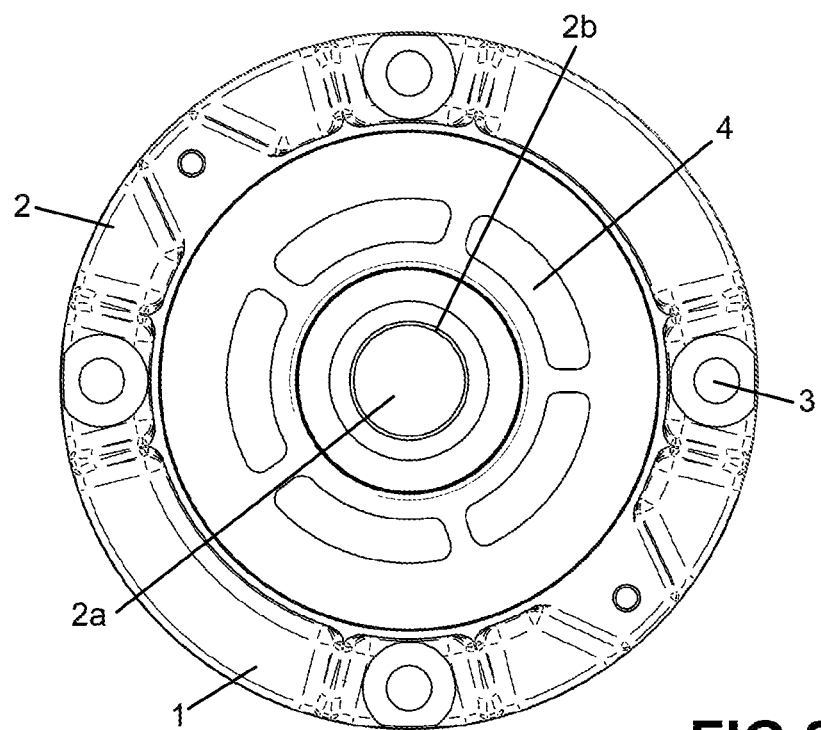
FIG. 2 Shows a second view of the extruder for an ice machine.
Figure 3:
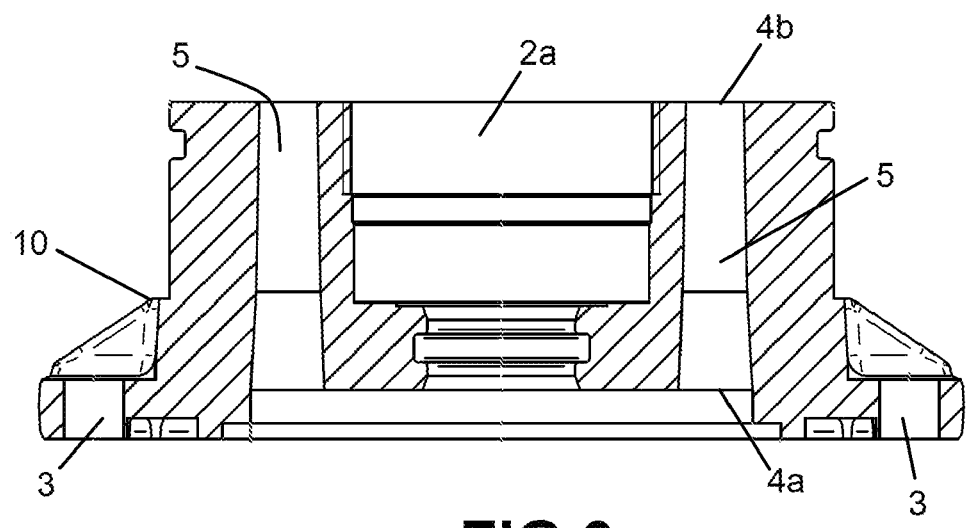
FIG. 3. Shows a view of a cross section of the extruder for an ice machine.

The attached figures show a preferred embodiment of the invention.

More specifically, the extruder for an ice machine, object of the present invention, is characterized in that it comprises a monoblock body (10) which is configured from a first body (1) that is essentially circular and hollow in the center thereof that is firmly joined to a second cylindrical body (2), hollow as well in the central portion (2a) thereof, and that on the lower portion thereof defines a threaded portion (2b) for the joining of the extruder to an ice machine, by the upper portion thereof, preferably in the area of the upper portion of the evaporator.

The first body (1) will incorporate a plurality of holes (3) which will enable the fastening thereof to an ice machine, in the upper area of the evaporator.

And wherein, in the central portion of said body (1) coinciding with the central portion of the second body (2), a plurality of hollows (4) are located in each body, coinciding in location with the ones located in the opposite body, facing each other, and which determine the inlet (4a) and the outlet (4b) of a series of channels (5) through which the ice will pass towards the outlet of the cited extruder.

The hollows (4) will have variable shapes and geometries, although preferably with a "kidney" shape with one concave side and another convex one, which on the ends thereof have slightly chamfered shapes and that will determine the shape of the ice once it has passed between the bodies (1,2).

The channels (5) will have a slightly conical shape, which will enable the reduction of the cross section of the ice as it passes from the inlet (4a) to the outlet (4b) thereof, determined by the cited hollows (4).

In a practical embodiment, the monoblock body (10) is made of brass, or other materials with equivalent mechanical characteristics, which is suitable for manufacturing food products, and which have an optimal response to working with water.

The invention claimed is:

1. An extruder for an ice machine, the extruder comprising:

a monoblock body which is configured from a first body, wherein the first body is essentially circular and has a hollow center, the first body is joined to a second cylindrical body, the second cylindrical body has a hollow center, the second cylindrical body having a lower portion with a threaded portion for joining to the ice machine, the first body includes a plurality of holes for fastening to the ice machine, a central portion of said first body coincides with a central portion of the second cylindrical body, a first plurality of hollows are located in said first body, a second plurality of hollows are located in said second cylindrical body, said first plurality of hollows coinciding in location with said second plurality of hollows, and facing each other, said first plurality of hollows and said second plurality of hollows having an inlet and an outlet of a series of channels through which ice passes towards the outlet of the extruder, and each hollow of said first plurality of hollows and said second plurality of hollows have a "kidney" shape with one concave side and another convex one, and ends of said first plurality of hollows and of said second plurality of hollows are chamfered once the ice has passed between the first body and the second cylindrical body.

2. The extruder for the ice machine according to claim 1, wherein the series of channels have a slightly conical shape, and the series of channels enable reduction of a cross section of the ice as the ice passes from the inlet to the outlet.

3. The extruder for the ice machine according to claim 1, wherein the monoblock body is made of brass.

4. The extruder for the ice machine according to claim 1, wherein the monoblock body is made of a material with equivalent mechanical characteristics as brass.

5. The extruder for the ice machine according to claim 1, wherein the monoblock body is made of a material which optimally resists working with water.

6. The extruder for the ice machine according to claim 1, wherein the monoblock both is made of a material which resists working with water.

7. The extruder for the ice machine according to claim 2, wherein the monoblock body is made of brass.

8. The extruder for the ice machine according to claim 2, wherein the monoblock body is made of a material with equivalent mechanical characteristics as brass.

9. The extruder for the ice machine according to claim 2, wherein the monoblock body is made of a material which resists working with water.

* * * * *